Oct. 9, 1923.
J. L. OPITZ
1,470,283
REAR AXLE EXTENSION DEVICE FOR TRACTORS
Filed Dec. 5, 1922
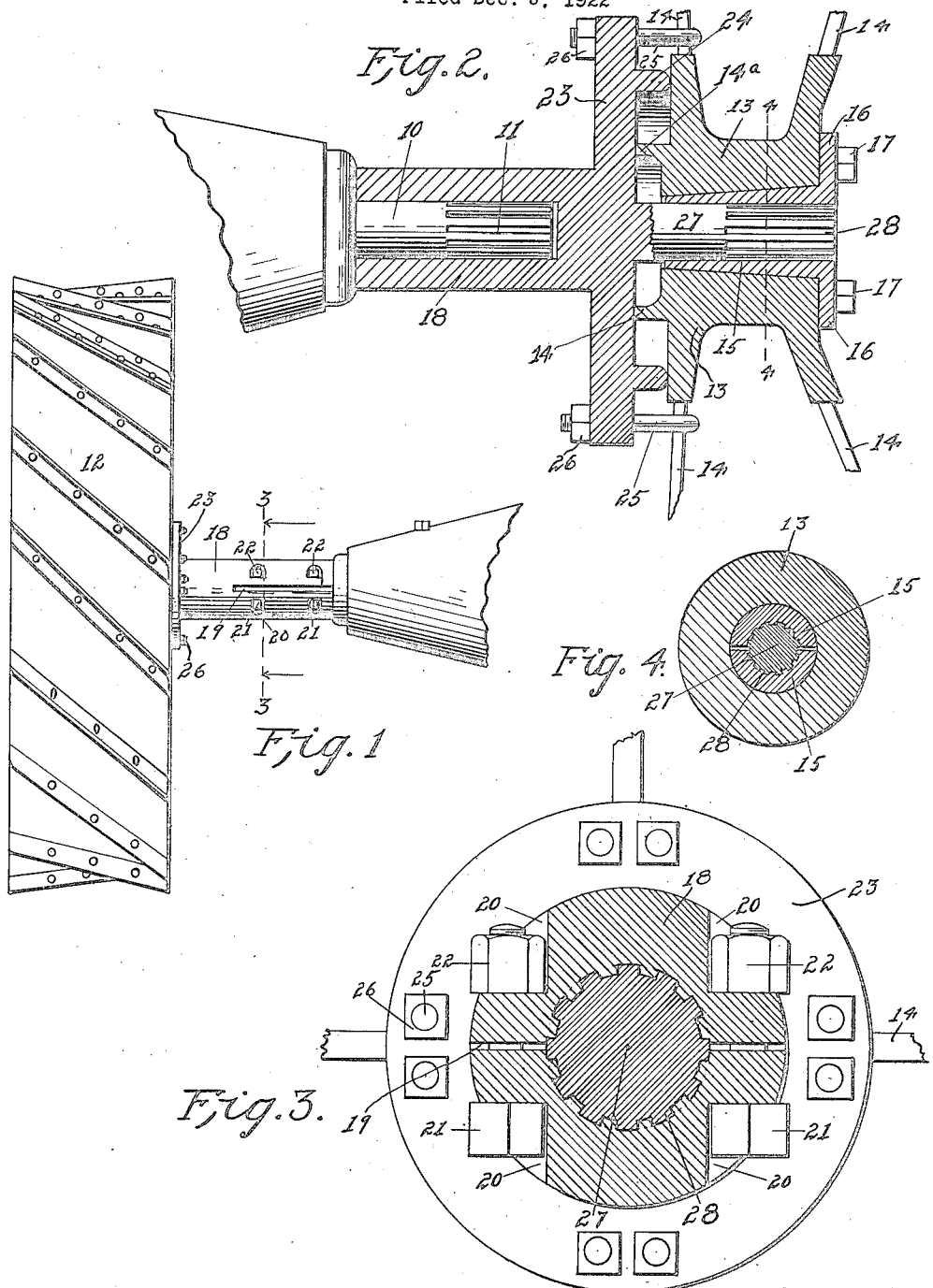

Patented Oct. 9, 1923.

1,470,283

UNITED STATES PATENT OFFICE.

JOHN L. OPITZ, OF CLARINDA, IOWA.

REAR-AXLE EXTENSION DEVICE FOR TRACTORS.

Application filed December 5, 1922. Serial No. 605,018.

*To all whom it may concern:*

Be it known that I, JOHN L. OPITZ, a citizen of the United States, and a resident of Clarinda, in the county of Page and State of Iowa, have invented a certain new and useful Rear-Axle Extension Device for Tractors, of which the following is a specification.

When tractors of the various kinds now in use are employed for agriculture purposes, they satisfactorily perform part of such agriculture work as for instance plowing, disking, harrowing, etc., but are not well adapted for work such for instance as cultivating crops that are grown in rows or check rows, as for instance corn, for the reason that the rear wheels are arranged at such a distance relative to each other as to make it very difficult for the operator to avoid driving the rear wheels upon the rows of corn, and hence it is customary to use tractors for part of such agriculture purpose and then employ draft animals for cultivating purposes.

The object of my invention is to provide extension devices for the rear axle whereby the rear tractor wheels may be spaced apart far enough so that they will straddle two rows of crop being cultivated, and travel between said two rows and the adjacent rows on both sides so that the tractor may be used for cultivating purposes.

More specifically it is my object to provide a device of this kind which may be used in the nature of an attachment and the tractor may be used for ordinary purposes in the manner in which it is originally constructed, and then when it is desired to use it for cultivating purposes, the extension axle may be readily, quickly and easily applied without interfering with or changing the operation of any other part of the tractor, and in this connection it is my object to provide an extension axle device of simple, durable and inexpensive construction that may be applied to the outer end of the tractor axle, and will be equally as strong and able to withstand strains as the axle to which it is applied.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a top or plan view of a tractor rear wheel with a portion of the tractor rear axle with my improved extension axle device applied thereto.

Figure 2 shows an enlarged, detail, longitudinal, sectional view illustrating the end of a tractor axle, and a part of the tractor wheel with my improved extension axle device applied thereto, as in use.

Figure 3 shows an enlarged sectional view on the line 3—3 of Figure 1; and

Figure 4 shows a sectional view on the line 4—4 of Figure 2.

Referring to the accompanying drawings I have used the reference numeral 10 to indicate the projecting end of a tractor rear axle, which is preferably provided with grooves 11 at its outer end. The tractor wheel is indicated generally by the numeral 12, and is formed with a hub 13 and spokes 14. It is also provided at its inner face with an inwardly extended flange 14$^a$.

For securing the wheel firmly to the axle there is usually provided a cylindrical wedge shaped device 15 formed with grooves to coact with the grooves 11, and being provided with a flange 16 at its outer end, which is secured by bolts 17 to the hub.

The parts previously described are of the ordinary construction now in common use and may be found, for instance on the so-called Fordson tractor.

My improved extension axle device comprises a cylindrical body portion 18 having at its inner end a cylindrical opening to receive the exposed end of the axle 10. This cylindrical body portion 18 is preferably slotted on opposite sides at 19, as shown in Figure 3, and on opposite sides of the slots, recesses are formed at 20, and bolts 21 are passed through said recesses on opposite sides of the slots 19, and nuts 22 are placed thereon, whereby when the nuts are drawn tight, the body portion 18 is firmly clamped to the axle.

At the outer end of the extension axle device is a disk shaped portion 23 preferably provided with an annular rib 24 extended outwardly and designed to engage and rest upon the inner face of the wheel hub 13. This rib 24 projects outwardly to the same extent as the rib 14 on the hub projects inwardly, so that when the rib 24 is in engagement with the hub, then the rib 14 will be in engagement with the disk 23.

Mounted in the outer end of the disk 23 is a series of U-bolts 25 designed to encircle the adjacent spokes 14, and to be extended through the disk 23 and provided with nuts 26 on the inner end of the disk 23.

Projecting outwardly from the center of the disk 23 is the extension axle member 27 which is provided with grooves 28 similar to the grooves 11. This part 27 is of the same size and shape as the exposed portion 10 of the rear axle.

In practical use and assuming that it is desired to widen the tread of a tractor, then the tractor wheels are removed in the ordinary manner and my improved extension axle is applied to the exposed axle ends, then the nuts 22 are tightened to firmly clamp it in this position, then the U-bolts 25 are connected to the spokes 14 and the nuts 26 drawn tight. The wheel is then placed on the axle portion 27 and firmly secured by the wedge device 15, whereupon the device is ready for use.

Obviously the large cylindrical body portion 18 strengthens and reinforces the exposed portion of the axle 10 so that this portion of the device is even stronger than the exposed portion of the axle 10. However, it is not possible to make the extension axle member 27 of any greater diameter, and hence the weakest place in the extension axle would be across the member 27 adjacent to the disk 23. However, by providing said disk 23 and clamping it firmly to the outer surface of the wheel, then the inner end portion of the extension axle 27 is strongly braced and reinforced, and the entire axle together with the extension thereof will have a strength greater than that of the original construction.

In practical use and when the tractor equipped with my extension rear axle is employed in the cultivation of corn, the two rows of corn over which the tractor passes will be directly under the parts 18 of the extenson axle members, and as these are elevated a considerable distance above the ground, and smooth and round, crops such as corn can be cultivated even after the corn is substantially higher than the distance from the axle device 18 to the ground, as the tops of the stalks will be bent over without injury.

I claim as my invention:

1. A device of the class described, comprising a body portion having at one end a cylindrical opening designed to receive a tractor rear axle, means for securing a tractor rear axle in said cylindrical opening, an extension axle member formed on the body portion and designed to be inserted in a tractor wheel hub, means for securing it therein, and a disk shaped member formed on the body portion, and means for clamping it to a tractor wheel.

2. In a device of the class described, the combination with a tractor rear axle, and a tractor wheel of an extension axle device comprising a body portion formed with an opening at one end to receive a tractor rear axle, said body portion being slotted on opposite sides, and bolts extended through said body portion and through the slots whereby when the bolts are tightened the slotted portions are contracted and clamped to the axle, said axle device being provided near its central portion with a disk shaped member, said disk shaped member having an outwardly extended rib designed to engage a tractor wheel hub, means at the outer end of the disk shaped portion for clamping it to a tractor wheel, an extension axle portion at the outer end of the extension axle device designed to extend through a wheel hub, and a wheel hub clamping device for securing the wheel hub to the said extension axle member, substantially as and for the purposes stated.

Des Moines, Iowa, August 11, 1922.

JOHN L. OPITZ.